United States Patent
Simoes et al.

(10) Patent No.: US 12,129,757 B2
(45) Date of Patent: Oct. 29, 2024

(54) AUTOMATIC WELL LOG CORRECTION

(71) Applicant: Schlumberger Technology Corporation, Sugar Land, TX (US)

(72) Inventors: Vanessa Simoes, Houston, TX (US); Hiren Maniar, Houston, TX (US); Tao Zhao, Houston, TX (US); Aria Abubakar, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/706,186

(22) PCT Filed: Nov. 4, 2022

(86) PCT No.: PCT/US2022/048941
§ 371 (c)(1),
(2) Date: Apr. 30, 2024

(87) PCT Pub. No.: WO2023/081343
PCT Pub. Date: May 11, 2023

(65) Prior Publication Data
US 2024/0328309 A1 Oct. 3, 2024

Related U.S. Application Data

(60) Provisional application No. 63/263,555, filed on Nov. 4, 2021.

(51) Int. Cl.
*E21B 47/13* (2012.01)
*E21B 47/12* (2012.01)
(Continued)

(52) U.S. Cl.
CPC .............. *E21B 47/138* (2020.05); *G01V 1/48* (2013.01); *G06N 20/00* (2019.01); *G01V 2210/6169* (2013.01)

(58) Field of Classification Search
CPC .................. E21B 47/138; G01V 1/48; G01V 2210/6169; G06N 20/00
See application file for complete search history.

(56) References Cited

U.S. PATENT DOCUMENTS 4,042,907 A 8/1977 Trouiller et al.
11,859,488 B2 * 1/2024 Thiruvenkatanathan .................... E21B 47/14

(Continued)

FOREIGN PATENT DOCUMENTS

CN 111652149 A * 9/2020 ......... G06K 9/00664
CN 111814347 A * 10/2020 ............. E21B 47/00
(Continued)

OTHER PUBLICATIONS

Sircar et al. "Application of machine learning and artificial intelligence in oil and gas industry" (Year: 2021).*
(Continued)

*Primary Examiner* — Eyob Hagos
(74) *Attorney, Agent, or Firm* — Jeffrey D. Frantz (57) ABSTRACT

A method includes receiving first training well logs, generating second training well logs by injecting one or more different types of systematic errors, random errors, or both into at least a portion of the first training well logs, training a machine learning model to correct well logs by configuring the machine learning model to reduce a dissimilarity between at least a portion of the first and second training well logs, receiving one or more implementation well logs, and generating one or more corrected well logs by correcting at least a portion of the one or more implementation well logs using the machine learning model that was trained.

21 Claims, 8 Drawing Sheets

(51) Int. Cl.
*G01V 1/48* (2006.01)
*G06N 20/00* (2019.01)

(56) References Cited

U.S. PATENT DOCUMENTS

| | | | |
|---|---|---|---|
| 2018/0061091 | A1 | 3/2018 | Wang |
| 2021/0012774 | A1 | 1/2021 | Sureka |
| 2021/0085238 | A1 | 3/2021 | Schnabel et al. |
| 2021/0304060 | A1* | 9/2021 | Al Madani ............. G06F 30/27 |
| 2022/0163503 | A1* | 5/2022 | Yang .................... G01N 33/241 |
| 2022/0268959 | A1* | 8/2022 | Walker ..................... G01V 1/52 |
| 2022/0397698 | A1* | 12/2022 | Bestman ................. G06F 30/28 |
| 2022/0414301 | A1* | 12/2022 | Thiruvenkatanathan .................... G06F 30/28 |

FOREIGN PATENT DOCUMENTS

| | | | | |
|---|---|---|---|---|
| CN | 113296152 | A | * | 8/2021 |
| CN | 113885077 | A | * | 1/2022 |
| CN | 113962244 | A | * | 1/2022 |
| CN | 116009065 | A | * | 4/2023 |
| CN | 113792685 | B | * | 3/2024 ............. G01V 1/288 |

OTHER PUBLICATIONS

Singh et al. "Machine Learning Assisted Petrophysical Logs Quality Control, Editing and Reconstruction" (Year: 2020).*
Search Report and Written Opinion of International Patent Application No. PCT/US2022/048941 dated Feb. 24, 2023, 8 pages.
Singh, M. et al., "Machine Learning Assisted Petrophysical Logs Quality Control, Editing and Reconstruction", SPE-202977, presented at the Abu Dhabi International Petroleum Exhibition & Conference, Abu Dhabi, 2020, 16 pages.
Glover, P. W. J., "Petrophysics MScCourse Notes", downloaded from the internet at [https://www.academia.edu/40407518/Contents_Copyright_Petrophysics_MSc_Course_Notes] on Mar. 27, 2024, 376 pages.
Hodges, R. E., "Calibration and Standardization of Geophysical Well-Logging Equipment for Hydrologic Applications", U.S. Geological Survey, Water-Resources Investigations Report 88-4058, 1988, 29 pages.
Mandal, P. P. et al., "Ensemble Learning for Predicting TOC from Well-Logs of the Unconventional Goldwyer Shale", Energies, 2022, 15, 216, pp. 1-30.
Farchi, A. et al., "Using machine learning to correct model error in data assimilation and forecast applications", Quarterly Journal of the Royal Meteorological Society, Jul. 26, 2021, pp. 3067-3084.

* cited by examiner

AUTOMATIC WELL LOG CORRECTION

CROSS-REFERENCE TO RELATED APPLICATIONS

This application is a National Stage Entry of International Application No. PCT/US2022/048941, filed on Nov. 4, 2022, which claims priority to U.S. Provisional Patent Application having Ser. No. 63/263,555, filed on Nov. 4, 2021, and is incorporated herein by reference in its entirety.

BACKGROUND

Well log interpretation may be at least partially implemented by software, that is, automated so that at least some of the processing is done by a computer. For example, well logs may be correlated (e.g., according to depth) using computer-processing algorithms, including machine learning.

To facilitate successful machine learning implementations in field-scale automated well log interpretation processes, the logs may be corrected for consistency within a well. Currently, the log corrections are performed manually and based on formation types that can be used as reference for having a value, such as pure calcite, anhydrite, and halite. This process is time consuming, and calls for the presence and identification of such layers. Further, there is not a systematic way to provide an uncertainty analysis to be used in future applications.

Further, a biased or absent correction in the logs may result in the machine learning model learning erroneous information from selected samples and consequently propagating the error into predictions that lead to false lithology and reservoir estimations, and cause difficulties in defining formation markers. Such systematic inconsistency or error may be generated in some of the logs, such as gamma ray and neutron porosity, by borehole effects, tool specifications and settings, and/or miscalibration.

SUMMARY

Embodiments of the disclosure include a method that includes receiving first training well logs, generating second training well logs by injecting one or more different types of systematic errors, random errors, or both into at least a portion of the first training well logs, training a machine learning model to correct well logs by configuring the machine learning model to reduce a dissimilarity between at least a portion of the first and second training well logs, receiving one or more implementation well logs, and generating one or more corrected well logs by correcting at least a portion of the one or more implementation well logs using the machine learning model that was trained.

Embodiments of the disclosure include a computing system having one or more processors and a memory system including one or more non-transitory computer-readable media storing instructions that, when executed by at least one of the one or more processors, cause the computing system to perform operations. The operations include receiving first training well logs, generating second training well logs by injecting one or more different types of systematic errors, random errors, or both into at least a portion of the first training well logs, training a machine learning model to correct well logs by configuring the machine learning model to reduce a dissimilarity between at least a portion of the first and second training well logs, receiving one or more implementation well logs, and generating one or more corrected well logs by correcting at least a portion of the one or more implementation well logs using the machine learning model that was trained.

A non-transitory computer-readable medium storing instructions that, when executed by at least one processor of a computing system, cause the computing system to perform operations. The operations include receiving first training well logs, generating second training well logs by injecting one or more different types of systematic errors, random errors, or both into at least a portion of the first training well logs, training a machine learning model to correct well logs by configuring the machine learning model to reduce a dissimilarity between at least a portion of the first and second training well logs, receiving one or more implementation well logs, and generating one or more corrected well logs by correcting at least a portion of the one or more implementation well logs using the machine learning model that was trained.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 1A:
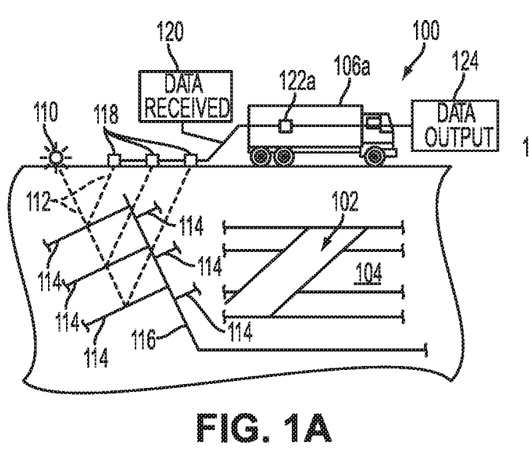
FIGS. 1A, 1B, 1C, 1D, 2, 3A, and 3B illustrate simplified, schematic views of an oilfield and its operation, according to an embodiment.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

Figure 1B:
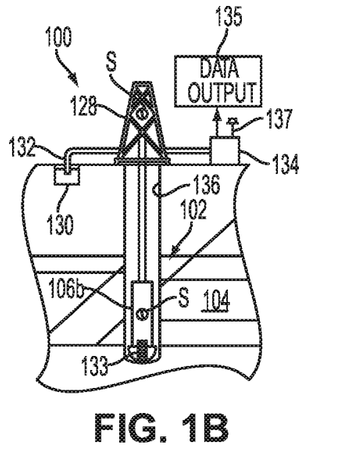

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figure 1C:
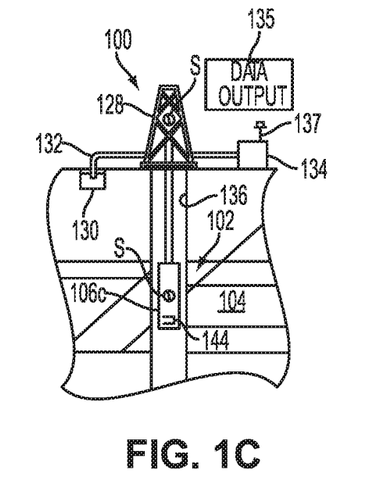

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

Figure 1D:
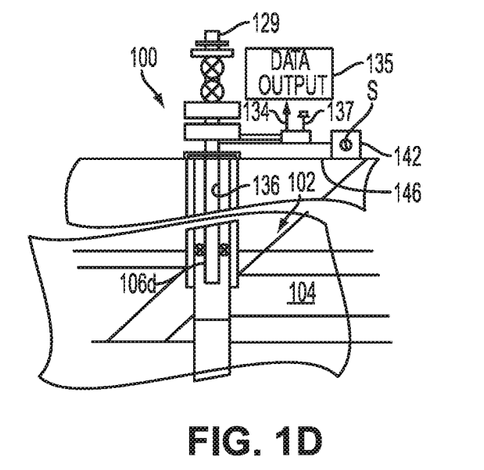

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
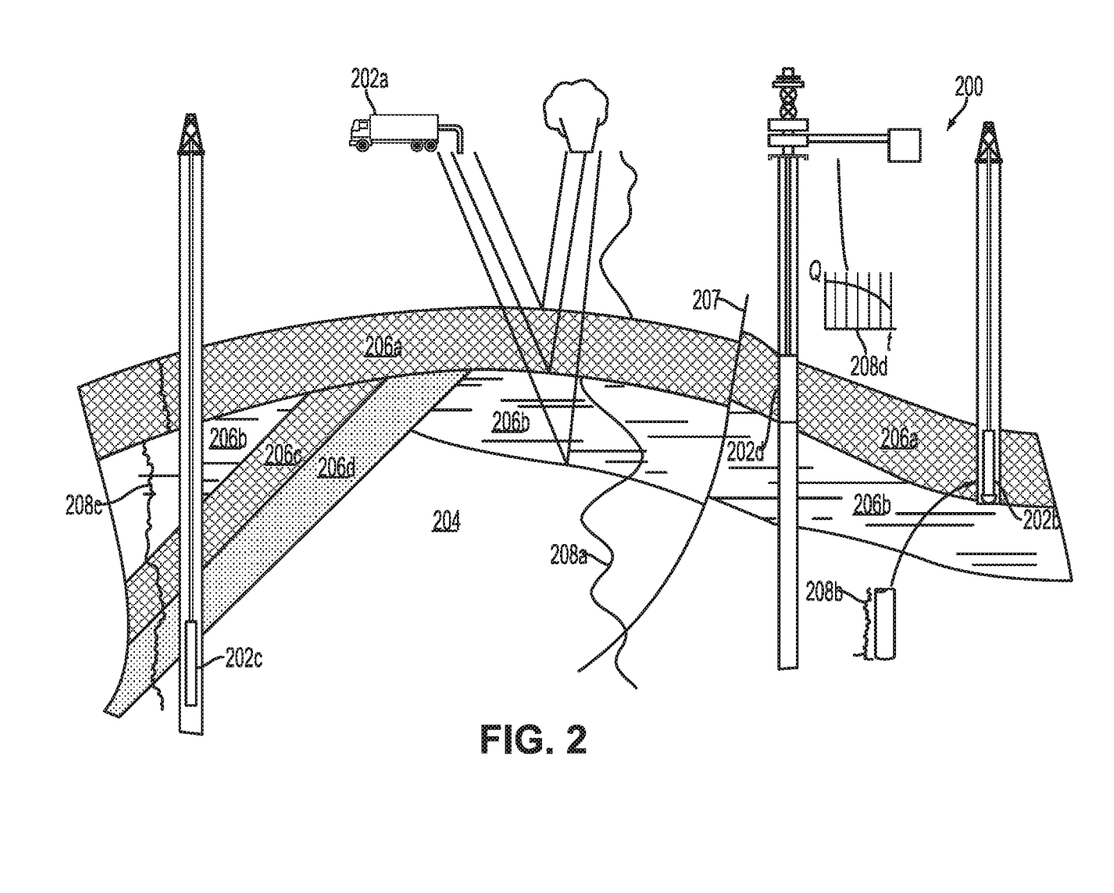

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIG. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
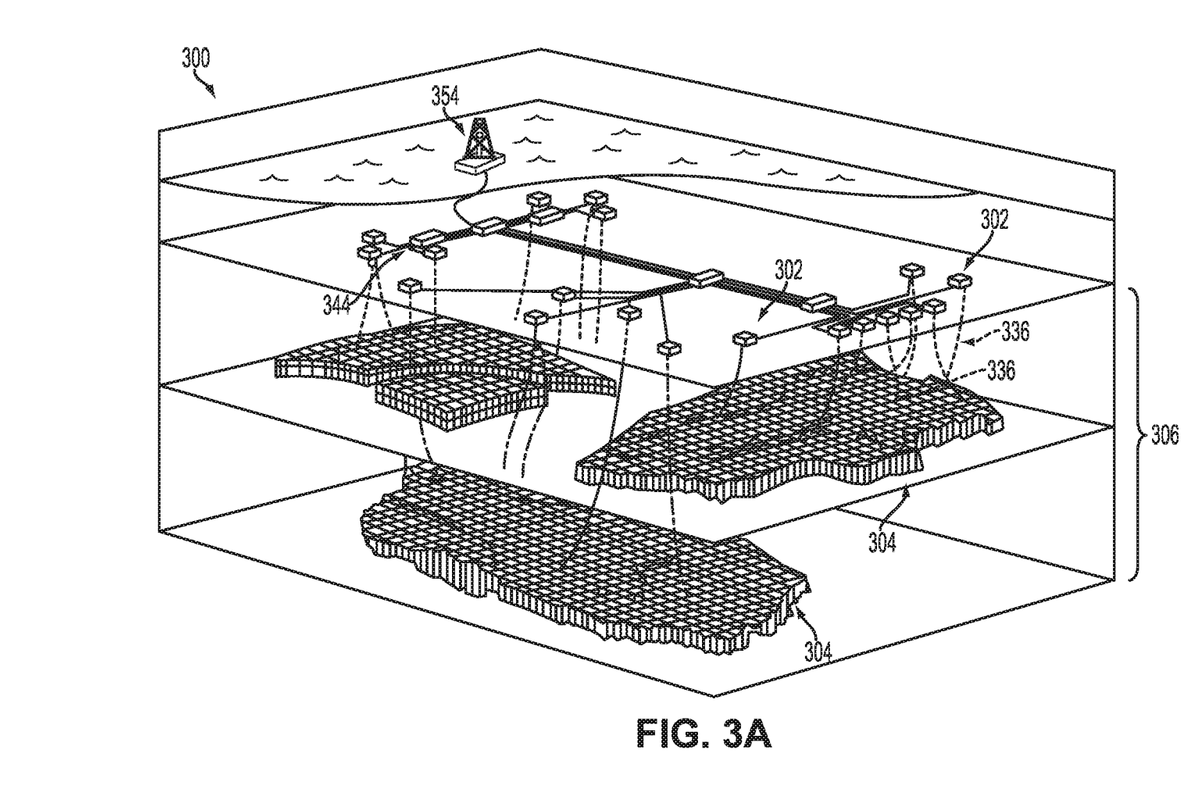

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
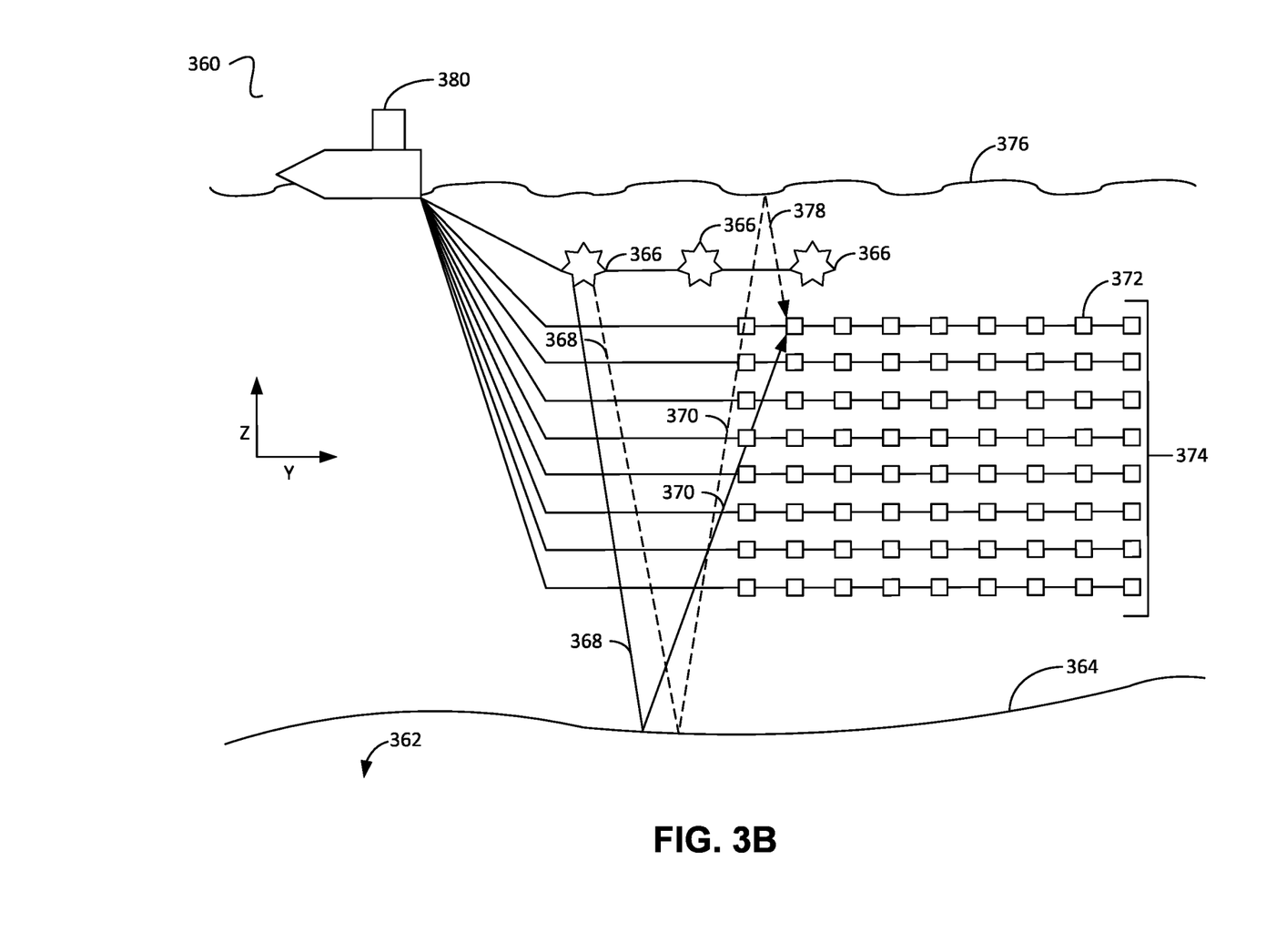

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Embodiments of the disclosure may include systems and methods to provide petrophysicists and/or other human users with a consistent set of well logs through an automated workflow, using deep learning methods. This may be at least partially achieved by "correcting" well logs to remove random or systematic errors therefrom. The corrections may be focused on systematic shifts, scaling or other error types, for example in the gamma ray and neutron logs, local errors due to washouts, processing mistakes, acquisition related errors are also considered, as well as other random noises in any logs.

Figure 4:
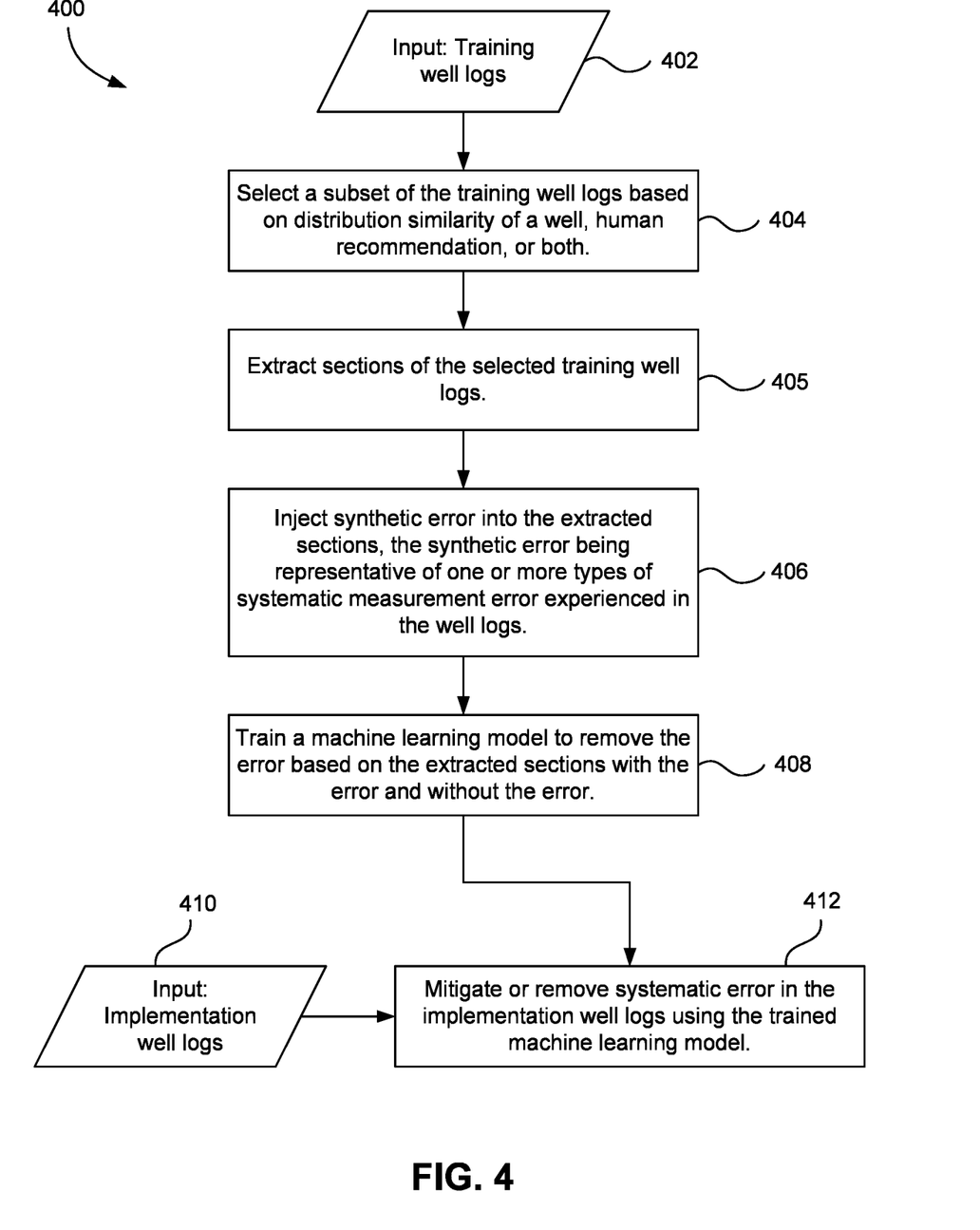
FIG. 4 illustrates a flowchart of a method for well log correction, according to an embodiment.
Figure 5A:
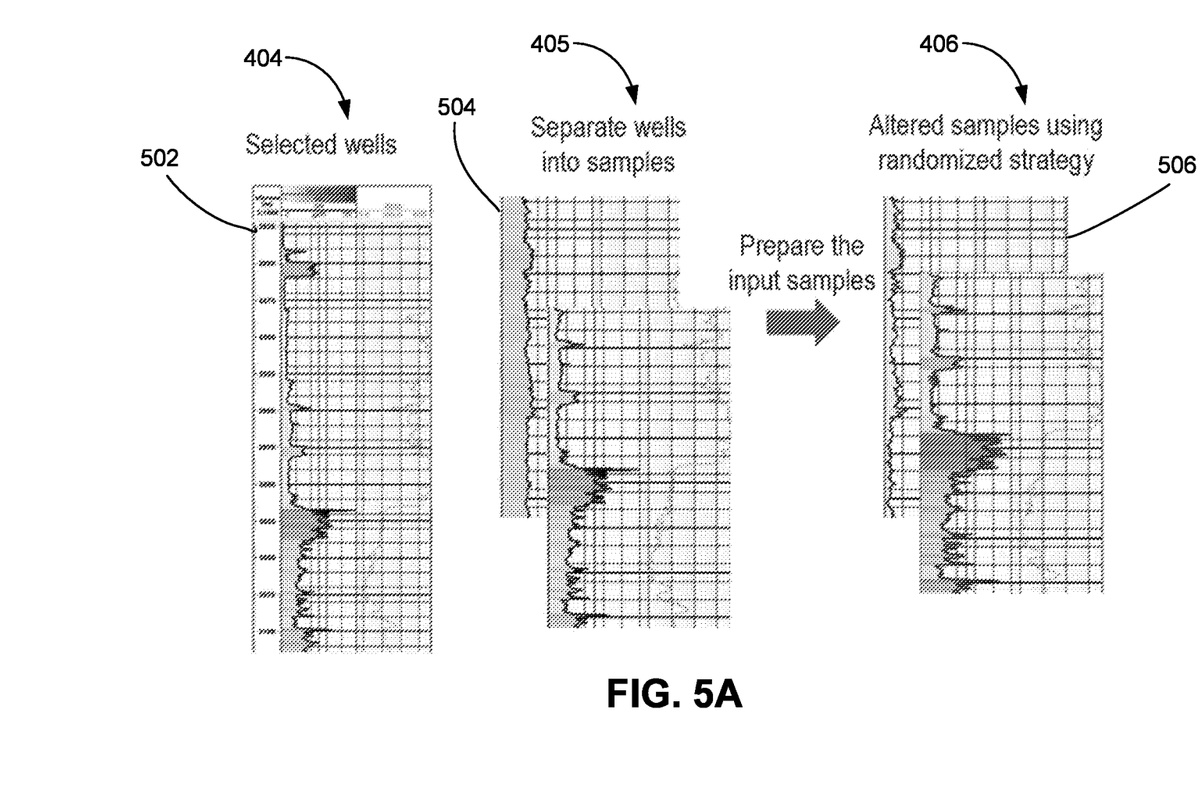
FIGS. 5A and 5B illustrate a graphical depiction of various aspects of the method, according to an embodiment.
Figure 5B:
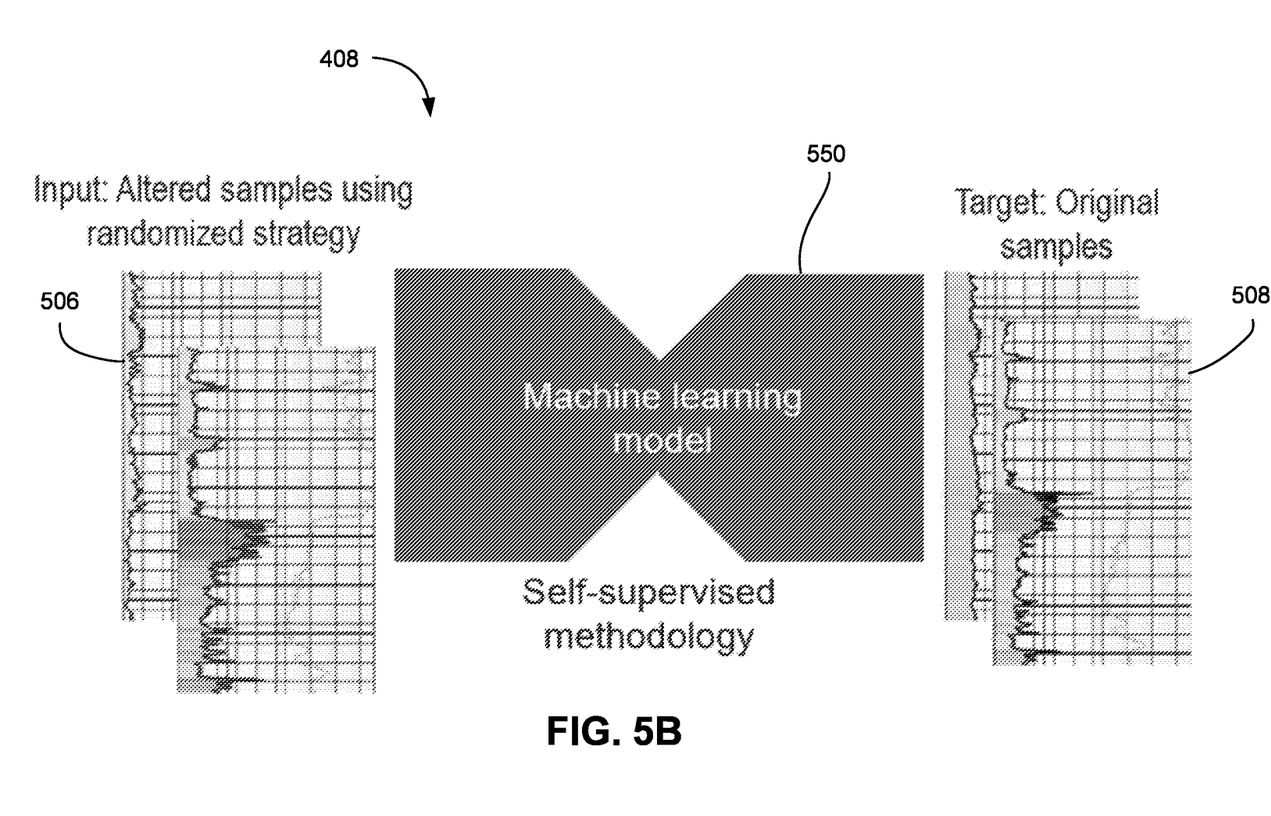

FIG. 4 illustrates a flowchart of a method 400 for correcting well logs, according to an embodiment. The actions of the method 400 may be executed in the order presented herein, or in any other order. Further, two or more of the actions may be combined or performed in parallel and/or any one of the actions may be split into two or more actions. FIGS. 5A and 5B illustrate graphical depictions of several of the aspects of the method 400, and the method 400 is described with additional reference thereto, according to an embodiment.

As shown, the method 400 includes receiving training well logs ("first" training well logs) as input from different wells, as at 402. These well logs may be of varying quality, with some including good distributions and low error inclusion, while others may have more error.

The method 400 may thus include selecting a subset of these training well logs, as at 404. This may be considered a "preprocessing" action for the method 400. The subset is depicted in FIG. 5A as well log 502. This preprocessing represents an automated suggestion of wells and/or well logs to be used as training and validation data. Using statistical and information theory, for example, the method 400 may suggest individual logs from a particular well, or entire wells including logs that have similar log distributions. For example, the similarity of the distribution may be quantified based on relative entropy, potentially followed by an unsupervised clustering process. The clustering may use a k-medoids partitioning algorithm and an inter cluster dissimilarity quantification.

In addition to automatic selection, the wells and/or individual well logs may be selected based on human expert recommendation, e.g., wells and/or logs that are already corrected by experts. In an embodiment, the preprocessing at 404 may be configured to select reference wells on which a machine learning model may learn log behavior after correction. Such reference wells may reflect the expected correction, and also contain a variety of formation types that represent the subsurface condition of the implementation well logs, as will be described in greater detail below.

The method 400 may then proceed to extracting sections or "samples" of the selected training well logs (e.g., the well logs associated with the recommended well), as at 405. These sections 504 in FIG. 5A, for example, may be depth intervals taken from the well logs. In some embodiments, the extracted sections may be selected at random. In other embodiments, the extracted selections may be intervals of the well or well logs selected based on a particular characteristic.

The method 400 may then proceed to injecting synthetic error, e.g., noise, into the extracted sections of the well logs, as at 406. This may generate, for example, "second" training well logs 506, e.g., the first training well logs with the addition of synthetic error. The injected error may be representative of one or more types of systematic measurement error that is experienced in well logs. To name a few examples of many contemplated, such errors may include lateral shift for neutron and gamma ray logs, scaling for gamma ray logs, small vertical shift for one or more logs, synthetically alterations resampling borehole effect on density and neutron porosity logs, more generally multiplicative and additive noise based on multiple distributions such as Gaussian, Cauchy, and gamma distributions.

The method 400 may then proceed to training a machine learning model 550 in FIG. 5B to remove the error that was injected based on the extracted sections with the error and without the error, e.g., using the first and second training logs 502, 506, as at 408. The machine learning model 550 may be trained, for example, to provide output in the form of corrected log curves 508, which may minimize the differences from the initial, first training logs 502. The training may thus include training the machine learning model to reduce a dissimilarity between at least a portion of the first training logs and a portion of the second training logs.

Further, the machine learning model 550 may provide multiple realizations of the corrected log curves, and thus may also be configured to provide output in the form of depth-by-depth standard deviation among the multiple realizations, and an uncertainty interval assuming a normal distribution among the multiple realizations. To account for uncertainty, Monte Carlo Dropout techniques are used with the addition of random alterations to the wells is used during training and inference. This uncertainty allows for visualizing intervals where the model is uncertain about the correction and allow the user to perform a visual analysis in the results.

For example, as shown in FIG. 5B, the machine learning model 550 may be a convolutional neural network (CNN). The sections with the noise and the sections without the noise may be provided as training inputs and outputs, so that the model is trained to predict what the log sections should include once the error/noise is removed. That is, the machine learning model is trained to identify and correct systematic and random errors such as shifts, gains, random noises, and small local disturbances, by adjusting the training well logs with error to more closely resemble the same logs without the error. One type of CNN architecture that may be used is a U-Net, including an encoder and a decoder, although other architectures may be employed. The training process is thus self-supervised and may not use or rely on human-introduced labels in the training data.

As part of the training process, the machine learning model 550 may be validated. For example, one or more of the extracted sections with noise injected, e.g., a section not used in the training, may be provided to the machine learning model 550. The machine learning model 550 may attempt to remove the error therefrom, and the output may be compared with the section that did not have the error injected.

Once trained, the machine learning model 550 may be implemented in the field. As shown, logs from nearby wells may be received, as at 408. The trained machine learning model may then be applied to these well logs, as at 410. As noted above, the output of the trained machine learning model may include corrected log curves, e.g., the well logs with the error/noise removed or at least reduced or mitigated, as at 412. Such corrected logs may be analyzed based on distribution and/or visual inspection by a human user. Further, the trained machine learning model 550 may also provide visualizations of uncertainty from the multiple realizations, standard deviation, etc. Among other things, this may facilitate an identification of zones where large corrections were made.

Accordingly, embodiments of the present disclosure permit a human expert to provide a set of logs that have been corrected according to reference wells using the context information that is extracted from the training wells. Using the training strategy of the synthetic added noise in the samples, the method learns to identify reference intervals and apply the correction. The correction may not be predefined by fixed rules but learned from examples, and therefore is flexible and adaptive comparing to existing methods.

In some practical applications, this method 400 may be employed as a preprocessing function for a log analysis of multiple wells in a single field. For example, embodiments of the present method 400 may be employed prior to performing volume of shale and porosity computation, marker detection, or seismic well log integration. This may facilitate revisiting a mature field with tens or hundreds of wells with triple combo logs available, or when there are a few corrected logs by an expert, which may be extrapolated for gleaning insights relevant to other, related wells. Further, the method may be employed in situations where there is clear strong part of the signal that is not reflecting the formation, such that the method 400 facilitates separating the signal representing the formation from noise. Moreover, the uncertainty that was calculated, the corrected well logs, or both can be presented ("visualized") to a user via a computer display of a graphical user interface.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 6:
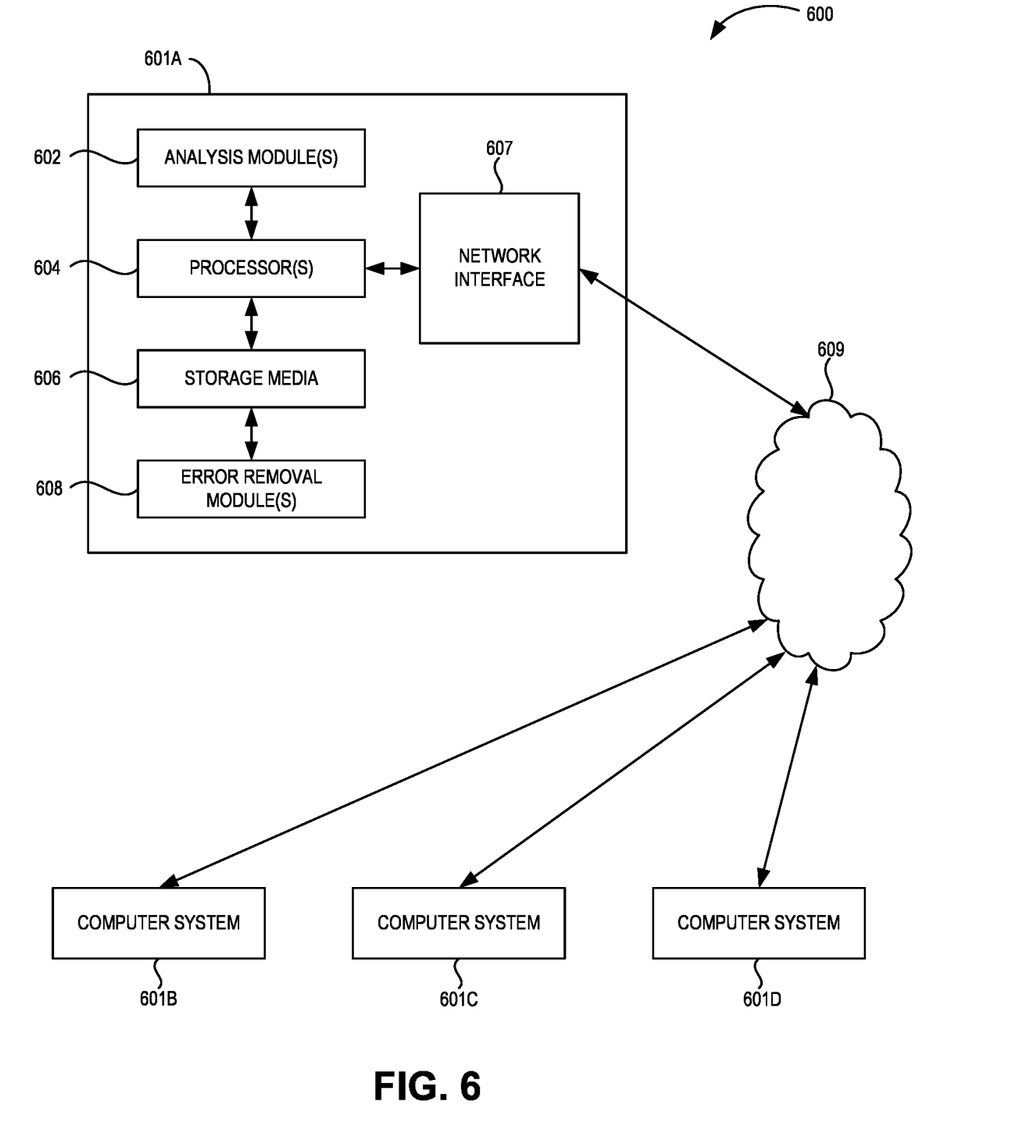
FIG. 6 illustrates a schematic view of a computing system, according to an embodiment.

In some embodiments, any of the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis module(s) 602 configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor can include a microprocessor, microcontroller, processor module or subsystem, programmable integrated circuit, programmable gate array, or another control or computing device.

The storage media 606 can be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY© disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 600 contains one or more error removal module(s) 608. In the example of computing system 600, computer system 601A includes the error removal module 608. In some embodiments, a single error removal module may be used to perform some or all aspects of one or more embodiments of the methods. In alternate embodiments, a plurality of error removal modules may be used to perform some or all aspects of methods.

It should be appreciated that computing system 600 is only one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   receiving first training well logs;
   generating second training well logs by injecting one or more types of systematic errors, random errors, or both into at least a portion of the first training well logs;

training a machine learning model to correct well logs by configuring the machine learning model to reduce a dissimilarity between at least a portion of the first training well logs and the second training well logs;

receiving one or more implementation well logs; and generating one or more corrected well logs by correcting at least a portion of the one or more implementation well logs using the machine learning model that was trained.

2. The method of claim 1, wherein the one or more types of systematic errors, random errors, or both are at least partially selected from the group consisting of lateral shift for neutron and gamma ray logs, scaling for gamma ray logs, vertical shift, synthetic alterations resampling a borehole effect on density and neutron porosity logs, multiplicative and additive noise based on multiple distributions including at least one of Gaussian, Cauchy, or gamma distributions.

3. The method of claim 1, comprising selecting a subset of the first training well logs based on a distribution of the subset of the first training well logs for an individual well represented by the first training well logs, a human-operator recommendation, or both, wherein generating the second training well logs includes injecting the one or more different types of systematic errors, random errors, or both into at least a portion of the subset, and wherein training the machine learning model includes reducing a dissimilarity between the subset of the first training well logs and a subset of the second training well logs.

4. The method of claim 1, wherein training the machine learning model includes reducing a dissimilarity between selected sections of the first training well logs and the second training well logs.

5. The method of claim 1, wherein correcting the at least a portion of the one or more implementation well logs includes generating a plurality of realizations of a corrected well log using the machine learning model, and determining an uncertainty based on a comparison of the plurality of realizations.

6. The method of claim 5, comprising generating a depth-by-depth standard deviation among the plurality of realizations, and an uncertainty interval based at least in part on a normal distribution among the plurality of realizations.

7. The method of claim 5, comprising visualizing the uncertainty.

8. The method of claim 1, comprising visualizing the one or more corrected well logs.

9. The method of claim 8, wherein visualizing the one or more corrected well logs includes depicting intervals of relatively high uncertainty, in comparison to uncertainties of other intervals of the well logs, and areas of relatively large corrections, in comparison to corrections in other intervals.

10. The method of claim 1, comprising performing a volume of shale calculation, porosity computation, marker detection, seismic well log integration, or a combination thereof based at least in part on the one or more corrected well logs.

11. A computing system comprising one or more processors and a memory system including one or more non-transitory computer-readable media storing instructions that, when executed by at least one of the one or more processors, cause the computing system to perform operations, the operations comprising:

receiving first training well logs;

generating second training well logs by injecting one or more types of systematic errors, random errors, or both into at least a portion of the first training well logs;

training a machine learning model to correct well logs by configuring the machine learning model to reduce a dissimilarity between at least a portion of the first training well logs and the second training well logs;

receiving one or more implementation well logs; and generating one or more corrected well logs by correcting at least a portion of the one or more implementation well logs using the machine learning model that was trained.

12. The computing system of claim 11, wherein the operations include selecting a well represented by a subset of the first training well logs based on a distribution of the subset of the first training well logs, a human-operator recommendation, or both, wherein generating the second training well logs includes injecting the one or more different types of systematic errors, random errors, or both into at least a portion of the subset, and wherein training the machine learning model includes reducing a dissimilarity between the subset of the first training well logs and a subset of the second training well logs.

13. The computing system of claim 11, wherein training the machine learning model includes reducing a dissimilarity between selected sections of the first training well logs and the second training well logs.

14. The computing system of claim 11, wherein correcting the at least a portion of the one or more implementation well logs includes generating a plurality of realizations of a corrected well log using the machine learning model, and determining an uncertainty based on a comparison of the plurality of realizations.

15. The computing system of claim 11, comprising a computer display, the operations including visualizing an uncertainty, the one or more corrected well logs, or both in a graphical user interface presented using the computer display that is visible to a user.

16. The computing system of claim 15, wherein visualizing the one or more corrected well logs includes depicting intervals of relatively high uncertainty, in comparison to uncertainties of other intervals of the one or more corrected well logs, and areas of relatively large corrections, in comparison to corrections in other intervals.

17. A non-transitory computer-readable medium storing instructions that, when executed by at least one processor of a computing system, cause the computing system to perform operations, the operations comprising:

receiving first training well logs;

generating second training well logs by injecting one or more different types of systematic errors, random errors, or both into at least a portion of the first training well logs;

training a machine learning model to correct well logs by configuring the machine learning model to reduce a dissimilarity between at least a portion of the first training well logs and the second training well logs;

receiving one or more implementation well logs; and generating one or more corrected well logs by correcting at least a portion of the one or more implementation well logs using the machine learning model that was trained.

18. The medium of claim 17, wherein the operations include selecting a well represented by a subset of the first training well logs based on a distribution of the subset of the first well logs, a human-operator recommendation, or both, wherein generating the second training well logs includes injecting the one or more different types of systematic errors, random errors, or both into at least a portion of the subset, and wherein training the machine learning model includes reducing a dissimilarity between the subset of the first training well logs and a subset of the second training well logs.

19. The medium of claim 17, wherein training the machine learning model includes reducing a dissimilarity between selected sections of the first training well logs and the second training well logs.

20. The medium of claim 17, wherein correcting the at least a portion of the one or more implementation well logs includes generating a plurality of realizations of a corrected well log using the machine learning model, and determining an uncertainty based on a comparison of the plurality of realizations.

21. The medium of claim 17, wherein the operations include visualizing an uncertainty, the one or more corrected well logs, or both in a graphical user interface presented using a computer display that is visible to a user.

* * * * *